United States Patent
Lee et al.

(10) Patent No.: US 8,698,694 B2
(45) Date of Patent: Apr. 15, 2014

(54) SCREW MECHANISM FOR ADJUSTING AN ANGLE OF AN ANTENNA MODULE AND RELATED ANTENNA SYSTEM

(75) Inventors: Ming-Chan Lee, Hsinchu (TW); Lan-Chun Yang, Hsinchu (TW); Hung-Yuan Lin, Hsinchu (TW); San-Yi Kuo, Hsinchu (TW); Wei-Te Chien, Hsinchu (TW); Yu-Fu Ku, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 407 days.

(21) Appl. No.: 13/083,597

(22) Filed: Apr. 11, 2011

(65) Prior Publication Data

US 2012/0212393 A1    Aug. 23, 2012

(30) Foreign Application Priority Data

Feb. 22, 2011  (TW) .............................. 100105751 A

(51) Int. Cl.
*H01Q 3/02* (2006.01)

(52) U.S. Cl.
USPC .......................................... 343/880; 343/882

(58) Field of Classification Search
USPC ....................................................... 343/880
See application file for complete search history.

(56) References Cited

U.S. PATENT DOCUMENTS

| 5,880,696 A * | 3/1999 | Koleda ........................ 343/702 |
| 6,031,508 A * | 2/2000 | Ishizuka et al. ............ 343/882 |
| 6,215,445 B1 * | 4/2001 | Chang ......................... 343/702 |
| 7,439,932 B2 * | 10/2008 | Lin ............................. 343/882 |
| 8,111,203 B2 * | 2/2012 | Sato ............................ 343/713 |
| 2010/0245200 A1 * | 9/2010 | Swais et al. .................. 343/790 |

* cited by examiner

*Primary Examiner* — Ahshik Kim
(74) *Attorney, Agent, or Firm* — Winston Hsu; Scott Margo

(57) ABSTRACT

A screw mechanism for adjusting an angle of an antenna module is disclosed in the present invention. The screw mechanism includes a screw rod. The screw rod includes a rod portion. A thread is formed on a first area of the rod portion. An annular protrusion is formed on a second area of the rod portion, and an outer diameter of the annular protrusion is greater than an outer diameter of the rod portion. The screw rod further includes a handle disposed on an end of the rod portion adjacent to the second area. The screw mechanism further includes an accommodating component whereon a sunken part is formed. The sunken part is for accommodating the annular protrusion of the screw rod. The screw mechanism further includes a screw having a side hole. The screw is installed on the first area of the screw rod and moves along the thread.

8 Claims, 4 Drawing Sheets

SCREW MECHANISM FOR ADJUSTING AN ANGLE OF AN ANTENNA MODULE AND RELATED ANTENNA SYSTEM

BACKGROUND OF THE INVENTION

1. Field of the Invention

The present invention relates to a screw mechanism, and more particularly, to a screw mechanism for adjusting an angle of an antenna module and a related antenna system.

2. Description of the Prior Art

A conventional screw mechanism includes a screw rod, an accommodating component and a screw having a side hole. The accommodating component and the screw are respectively disposed on two ends of the screw rod. A thread is formed on a surface of the screw rod, and an annular slot is disposed on the surface of the screw rod. The accommodating component includes a square protrusion, and dimensions of the square protrusion are equal to dimensions of the annular slot. When the screw rod is assembled with the accommodating component, and the square protrusion is engaged inside the annular slot, the screw having the side hole moves relative to the accommodating component along the thread on the screw rod by rotating the screw rod. However, the conventional screw rod becomes shorter and thin due to microstructure trend, so that strength of the screw rod is decreased due to the cutting slot on the conventional screw rod. For example, the conventional screw rod is deformed or damaged easily by press of the accommodating component or the screw having the side hole. Thus, design of a screw mechanism having great structural strength and conforming to microstructure design is an important issue in the mechanical industry.

SUMMARY OF THE INVENTION

The present invention provides a screw mechanism for adjusting an angle of an antenna module and a related antenna system for solving above drawbacks.

According to the claimed invention, a screw mechanism includes a screw rod comprising. The screw rod includes a rod portion. A thread is formed on a first area of the rod portion, an annular protrusion is formed on a second area of the rod portion, and an outer diameter of the annular protrusion is greater than an outer diameter of the rod portion. The screw rod further includes a handle disposed on an end of the rod portion adjacent to the second area. The screw mechanism further includes an accommodating component whereon a sunken slot is formed, and the sunken slot is for accommodating the annular protrusion of the screw rod. The screw mechanism further includes a screw having a side hole, the screw being installed on the first area of the screw rod for moving relative to the accommodating component along the thread of the screw rod when the screw rod is rotated.

According to the claimed invention, the screw rod further comprises a dial connecting to the handle of the screw rod.

According to the claimed invention, the dial is integrated with the handle of the screw rod monolithically or the dial is a separate component for disposing on the handle of the screw rod.

According to the claimed invention, the screw rod does not move relative to the accommodating component when the screw rod is rotated.

According to the claimed invention, an antenna system includes a supporter, an antenna module, and a screw mechanism disposed between the supporter and the antenna module. The screw mechanism includes a screw rod comprising. The screw rod includes a rod portion. A thread is formed on a first area of the rod portion, an annular protrusion is formed on a second area of the rod portion, and an outer diameter of the annular protrusion is greater than an outer diameter of the rod portion. The screw rod further includes a handle disposed on an end of the rod portion adjacent to the second area. The screw mechanism further includes an accommodating component whereon a sunken slot is formed, and the sunken slot is for accommodating the annular protrusion of the screw rod. The screw mechanism further includes a screw having a side hole, the screw being installed on the first area of the screw rod for moving relative to the accommodating component along the thread of the screw rod when the screw rod is rotated.

The present invention disposes the annular protrusion on the screw rod, and the outer diameter of the annular protrusion is substantially greater than the outer diameter of the rod portion, so that the screw rod of the present invention has great structural strength for ensuring stable operation of the screw mechanism in the recent micro mechanism trend.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
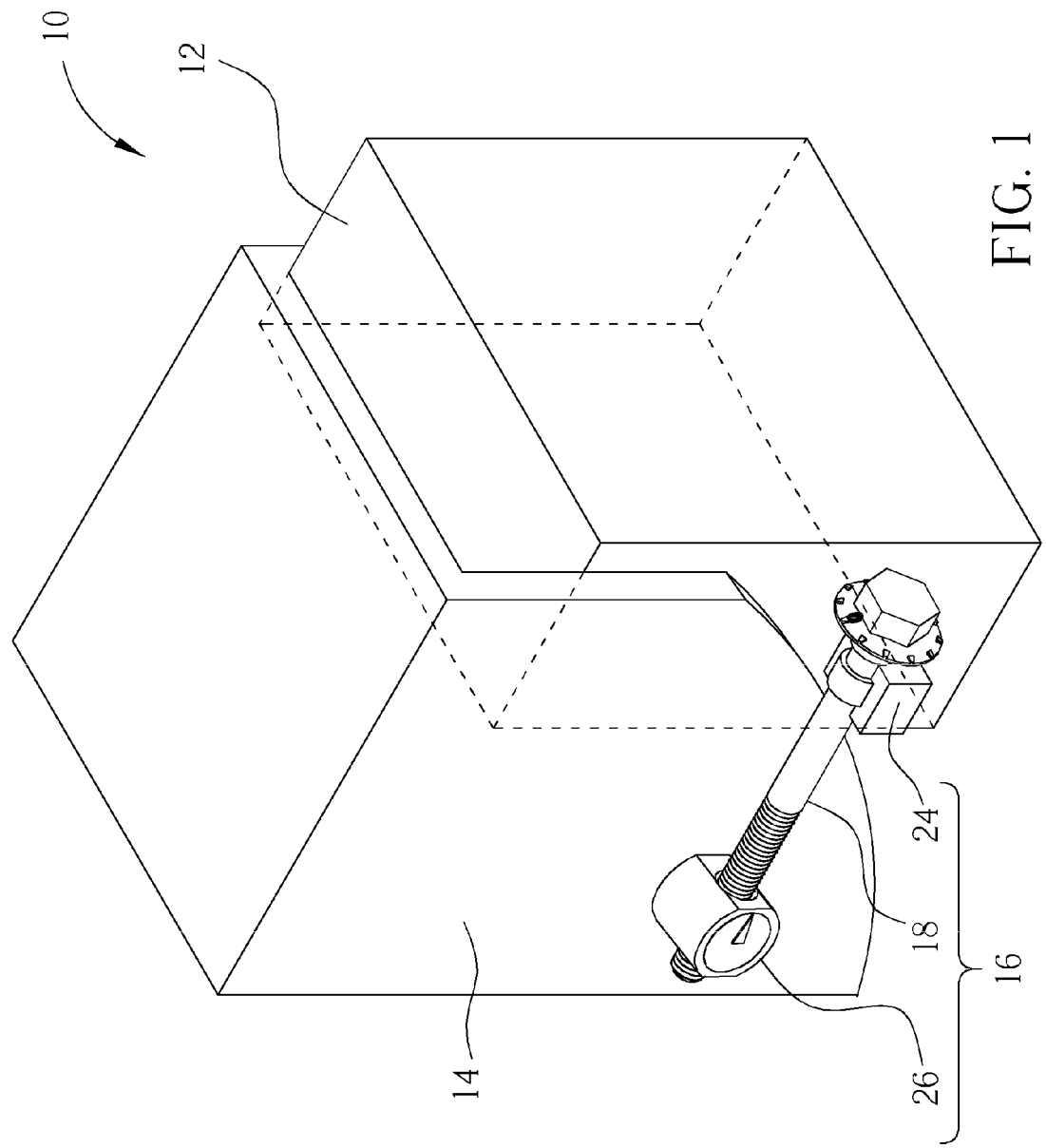
FIG. 1 is a diagram of an antenna system according to an embodiment of the present invention.

Please refer to FIG. 1. FIG. 1 is a diagram of an antenna system 10 according to an embodiment of the present invention. The antenna system 10 includes a supporter 12, an antenna module 14 and a screw mechanism 16. The screw mechanism 16 is disposed between the supporter 12 and the antenna module 14 for adjusting an angle between the antenna module 14 and the supporter 12.

Figure 2:
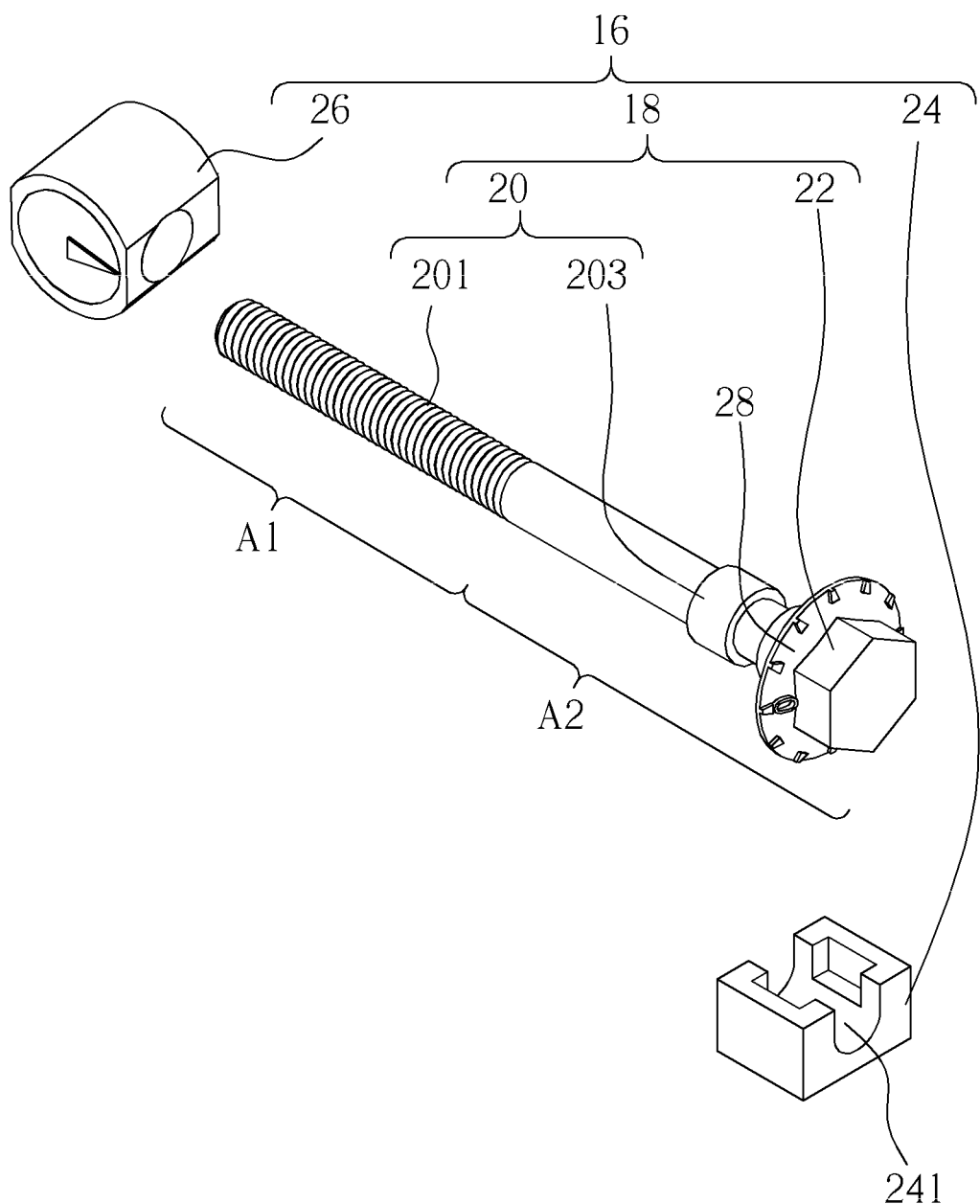
FIG. 2 is an exploded diagram of a screw mechanism according to the embodiment of the present invention.
Figure 3:
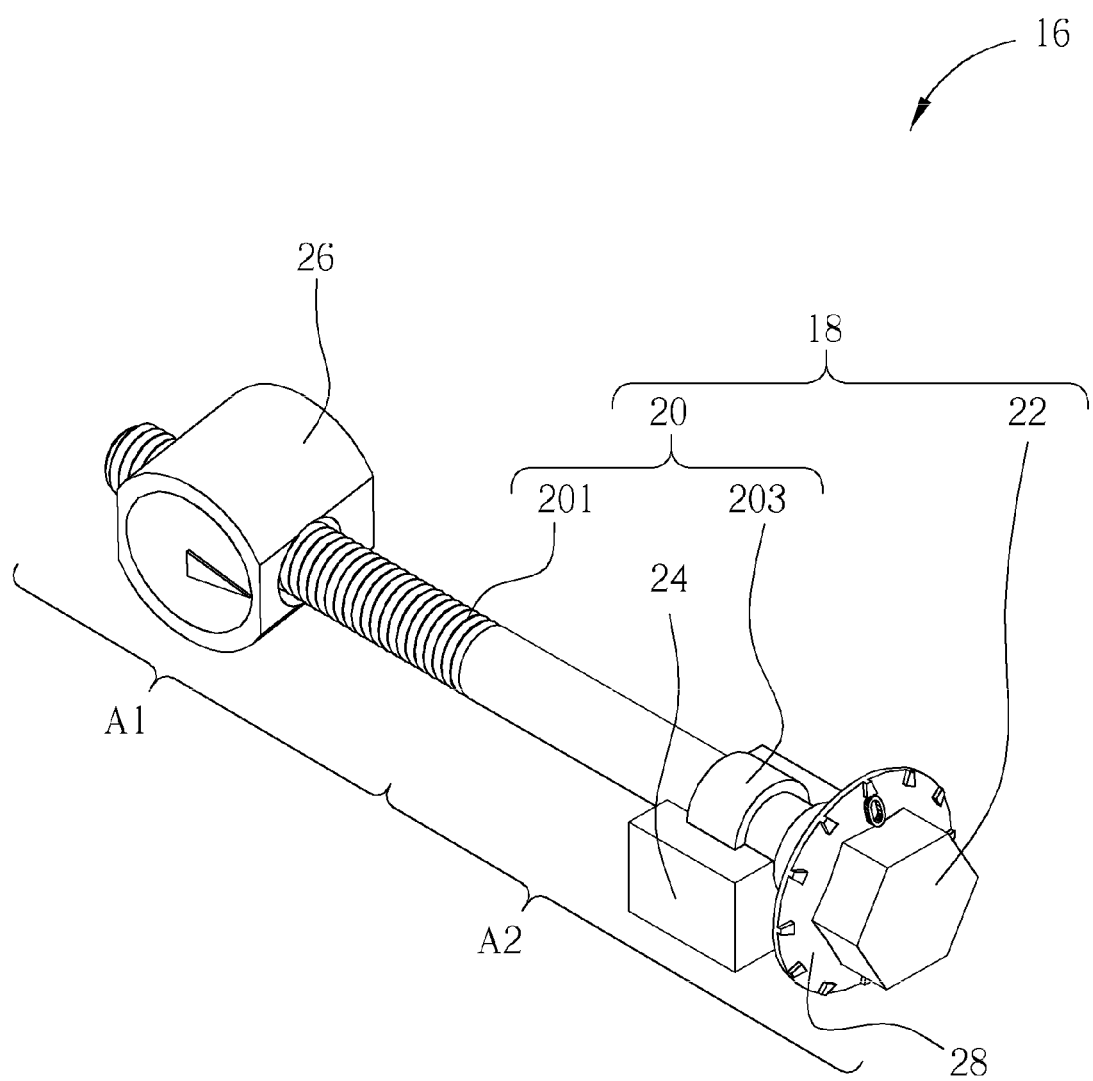
FIG. 3 is an assembly diagram of the screw mechanism according to the embodiment of the present invention.

Please refer to FIG. 2 and FIG. 3. FIG. 2 is an exploded diagram of the screw mechanism 16 according to the embodiment of the present invention. FIG. 3 is an assembly diagram of the screw mechanism 16 according to the embodiment of the present invention. The screw mechanism 16 includes a screw rod 18. The screw rod 18 includes a rod portion 20. A thread 201 is formed on a first area A1 of the rod portion 20, an annular protrusion 203 is disposed on a second area A2 of the rod portion 20, and an outer diameter of the annular protrusion 203 is greater than an outer diameter of the rod portion 20. The screw rod 18 further includes a handle 22 disposed on an end of the rod portion 20 adjacent to the second area A2. The screw mechanism 16 further includes an accommodating component 24 disposed on the supporter 12. A sunken slot 241 is formed on the accommodating component 24 for accommodating the annular protrusion 203 of the rod portion 18. The screw mechanism 16 further includes a screw 26 having a side hole. The screw 26 is disposed on the antenna module 14 and installed on the first area A1 of the rod portion 18. As shown in FIG. 1 to FIG. 3, the screw 26 is for moving relative to the accommodating component 24 along the thread 201 on the screw rod 18 when the screw rod 18 is rotated, so as to adjust the angle between the antenna module 14 and the supporter 12.

Figure 4:
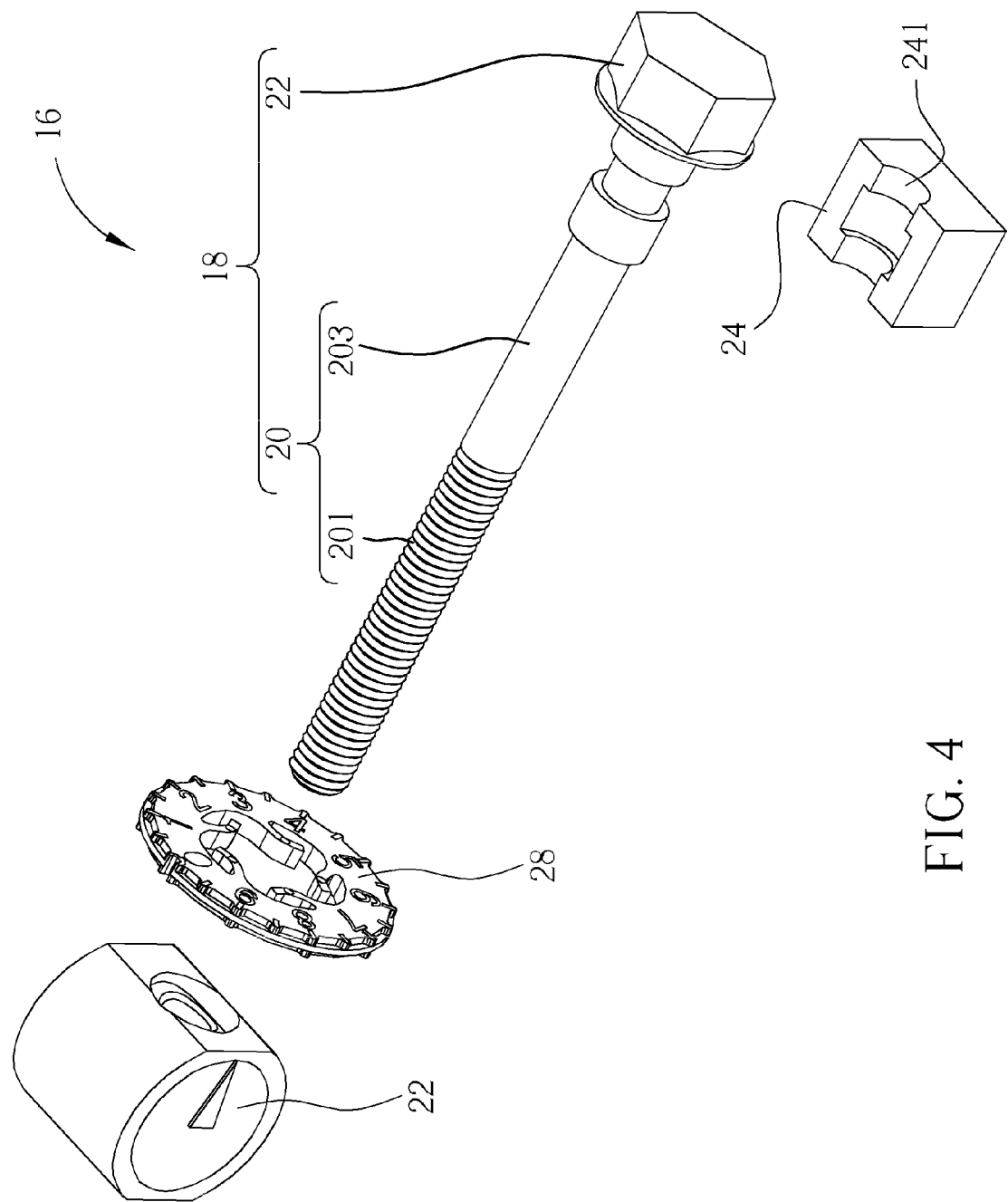
FIG. 4 is an explode diagram of a dial and a screw rod according to another embodiment of the present invention.

In addition, the screw rod 18 can further include a dial 28 connecting to the handle 22 of the screw rod 18 for providing information of the angle of the antenna module 14 relative to the supporter 12 when the screw rod 18 is rotated and the antenna module 14 is rotated relative to the supporter 12. The dial 28 can be integrated with the handle 22 of the screw rod 18 monolithically, as shown in FIG. 1 to FIG. 3, so as to decrease an amount of components of the screw mechanism 16 for decreasing manufacturing cost and assembly hours of the screw mechanism 16. Further, the dial 28 and the screw rod 18 can be two separate components. Please refer to FIG. 4. FIG. 4 is an explode diagram of the dial 28 and the screw rod 18 according to another embodiment of the present invention. The dial 28 can be a circular-shaped disk for disposing on the handle 22 of the screw rod 18.

In conclusion, the screw mechanism 16 of the present invention disposes the annular protrusion 203 on the second area A2 of the screw rod 18. The annular protrusion 203 can be disposed on the rod portion 20 of the screw rod 18 by mechanical treatment, such as cutting or soldering. The sunken slot 241 can be formed on the accommodating component 24 of the screw mechanism 16, and dimensions of the sunken slot 241 correspond to dimensions of the annular protrusion 203, so that the annular protrusion 203 can be accommodated inside the sunken slot 241. When the screw rod 18 is rotated, the annular protrusion 203 revolves about its own axis inside the sunken slot 241, so that the screw rod 18 does not move relative to the accommodating component 24 when rotating. Furthermore, when the screw rod 18 is rotated, the screw 26 moves relative to the accommodating component 24 along the thread 201 of the screw rod 18. Therefore, the screw rod 18 can be rotated for adjust the angle between the antenna module 14 and the supporter 12, so as to vary an elevation or an azimuth of the antenna module 14.

Comparing to the prior art, the present invention disposes the annular protrusion on the screw rod, and the outer diameter of the annular protrusion is substantially greater than the outer diameter of the rod portion, so that the screw rod of the present invention has great structural strength for ensuring stable operation of the screw mechanism in the recent micro mechanism trend.

Those skilled in the art will readily observe that numerous modifications and alterations of the device and method may be made while retaining the teachings of the invention.

What is claimed is:

1. A screw mechanism comprising:
   a screw rod comprising:
      a rod portion, a thread being formed on a first area of the rod portion, an annular protrusion being formed on a second area of the rod portion, and an outer diameter of the annular protrusion being greater than an outer diameter of the thread; and
      a handle disposed on an end of the rod portion adjacent to the second area;
   an accommodating component whereon a sunken slot is formed, the sunken slot being for rotatable and detachably accommodating the annular protrusion of the screw rod; and
   a screw having a side hole, the screw being installed on the first area of the screw rod for moving along the thread of the screw rod to adjust relative position between the screw and the accommodating component when the screw rod is rotated.

2. The screw mechanism of claim 1, wherein the screw rod further comprises a dial connecting to the handle of the screw rod.

3. The screw mechanism of claim 2, wherein the dial is integrated with the handle of the screw rod monolithically or the dial is a separate component for disposing on the handle of the screw rod.

4. The screw mechanism of claim 1, wherein the screw rod does not move relative to the accommodating component when the screw rod is rotated.

5. An antenna system comprising:
   a supporter;
   an antenna module; and
   a screw mechanism disposed between the supporter and the antenna module, the screw mechanism comprising:
      a screw rod comprising:
         a rod portion, a thread being formed on a first area of the rod portion, an annular protrusion being formed on a second area of the rod portion, and an outer diameter of the annular protrusion being greater than an outer diameter of the thread; and
         a handle disposed on an end of the rod portion adjacent to the second area;
      an accommodating component disposed on the supporter, a sunken slot being formed on the accommodating component for rotatable and detachably accommodating the annular protrusion of the screw rod; and
      a screw having a side hole, the screw being disposed on the antenna module and installed on the first area of the screw rod for moving along the thread of the screw rod to adjust relative position between the screw and the accommodating component when the screw rod is rotated, so as to adjust an angle between the antenna module and the supporter.

6. The antenna system of claim 5, wherein the screw rod further comprises a dial connecting to the handle of the screw rod.

7. The antenna system of claim 6, wherein the dial is integrated with the handle of the screw rod monolithically or the dial is a separate component for disposing on the handle of the screw rod.

8. The antenna system of claim 5, wherein the screw rod does not move relative to the accommodating component when the screw rod is rotated.

* * * * *